United States Patent [19]

Hensler

[11] Patent Number: 4,997,634
[45] Date of Patent: Mar. 5, 1991

[54] PREPARATION OF MEDIUM DENSITY, FAST-DISSOLVING, TETRASODIUM PYROPHOSPHATE

[75] Inventor: Paul L. Hensler, Lawrence, Kans.

[73] Assignee: FMC Corporation, Philadelphia, Pa.

[21] Appl. No.: 517,778

[22] Filed: May 2, 1990

[51] Int. Cl.$^5$ ............................................. C01B 25/168
[52] U.S. Cl. ................................................... 423/305
[58] Field of Search ........................................ 423/305

[56] References Cited

U.S. PATENT DOCUMENTS

| | | | |
|---|---|---|---|
| 1,654,283 | 12/1927 | Dickerson | 423/305 |
| 1,972,032 | 8/1934 | Reimann | 423/305 |
| 2,358,965 | 9/1944 | Durgin et al. | 210/23 |
| 2,427,642 | 9/1947 | Aitchison | 423/305 |
| 3,230,044 | 1/1966 | Edwards et al. | 423/305 |
| 3,361,523 | 1/1968 | Yu Shen | 23/106 |
| 3,562,768 | 2/1971 | Edquist et al. | 23/107 |
| 3,652,205 | 3/1972 | Kern et al. | 423/305 |
| 3,981,974 | 9/1976 | Coad et al. | 423/315 |
| 4,873,068 | 10/1989 | Hensler | 423/315 |

Primary Examiner—Wayne A. Langel
Attorney, Agent, or Firm—Frank Ianno; Robert L. Andersen

[57] ABSTRACT

Process for producing granular tetrasodium pyrophosphate having a bulk density of about 0.73 to about 0.84 g/ml and a dissolving time of about three minutes or less by heating crystalline disodium orthophosphate dihydrate at a slow heating rate, not over about 5° C. per minute, until its temperature reaches about 130° C. and then calcining it at about 350° C. to about 550° C. until it is converted to tetrasodium pyrophosphate.

6 Claims, No Drawings

PREPARATION OF MEDIUM DENSITY, FAST-DISSOLVING, TETRASODIUM PYROPHOSPHATE

This invention relates to a new process for producing a medium density, fast-dissolving, tetrasodium pyrophosphate (TSPP) from a crystalline disodium orthophosphate dihydrate (DSP.Duo).

Methods for preparing TSPP are well known to those skilled in the art. Such methods usually include the reaction of phosphoric acid with an alkali metal compound such as sodium hydroxide or sodium carbonate to form a disodium orthophosphate solution. This solution is then dried and calcined to the condensed tetrasodium pyrophosphate in a number of different processes, but none of these have been found capable of producing a pyrophosphate salt that yields the combination of a medium density (about 0.73 to about 0.84 grams per liter) and which is fast dissolving (that is, dissolves in about three minutes or less, in a dissolving test described hereinafter).

One known method of drying and calcining disodium orthophosphate salts, is a rotary dryer process wherein the dissolved orthophosphate solution is fed into a rotating horizontal tube containing flights to lift and shower the liquor through a countercurrent flow of hot gases. The hot gases enter the rotating tube at about 900° C. from the end opposite the feed end of the tube. Water is evaporated from the liquor causing disodium orthophosphate to crystallize. As the disodium crystals proceed towards the hot zone, where the hot gases enter the tube, the crystals are condensed into sodium tetrapyrophosphate and the agglomerated product is discharged from the hot end of the tube at about 350° C. to about 550° C. The calcined product is screened to separate a granular fraction which passes through a US Standard 18 Mesh Screen and is retained on a US Standard 100 Mesh Screen. Tetrasodium pyrophosphate made by this method has a bulk density of about 1.10 grams per milliliter and a dissolving rate of about 6 minutes.

An alternate method is a spray dryer process wherein the disodium orthophosphate liquor is sprayed as a fine mist into a tower where the droplets contact heated gases and are rapidly dried and calcined. Tetrasodium pyrophosphate made by this method has a bulk density of about 0.55 grams per milliliter and a dissolving rate of about three minutes.

The combined properties of medium density and fast dissolving rates have become increasingly desirable as more TSPP is used in detergent and other water-treating applications. The medium density is required to prevent segregation of the TSPP in the box from the other ingredients of the detergent or other water-treating formations. The fast dissolving in water has become essential to avoid leaving any ingredients of the detergent or other water-treating formulations undissolved.

It is also known in the art to produce TSPP from other starting materials than solutions of disodium orthophosphate. U.S. Pat. No. 4,873,068 teaches a process in which TSPP is obtained by calcining sodium tripolyphosphate and sodium carbonate, or a salt capable of forming sodium carbonate, to temperatures of from about 300° C. to about 700° C.

U.S. Pat. No. 3,981,974 teaches reacting an alkali metal nitrate with aqueous phosphoric acid in the presence of a catalytic amount of a metal oxide at a temperature of at least about 700° C. to produce an alkali metal phosphate suitable for plant food.

U.S. Pat. No. 3,361,523 teaches a two-step process for producing various crystalline condensed phosphates, such as tetrasodium pyrophosphate. In the first step, a condensed phosphoric acid is reacted with an alkali metal source to form an amorphous intermediate condensed phosphate material. Thereafter the amorphous condensed phosphate is ground and calcined at a temperature below the liquefaction temperature of the desired product for a time sufficient to effect a solid phase conversion.

It is an object of this invention to provide an efficient process for preparing granular tetrasodium pyrophosphate which exhibits a medium bulk density and which is fast dissolving.

I have now surprisingly found that TSPP having a bulk density of from about 0.73 to about 0.84 grams per milliliter and a dissolving time of about three minutes or less can be obtained by heating crystalline disodium orthophosphate dihydrate at a slow heating rate, not above about 5° C. per minute, until its temperature reaches about 130° C. and then calcining it to a temperature of from about 350° C. to about 550° C. until it has been converted to TSPP.

I have further found that the precise bulk density of the TSPP within this medium bulk density range can be further controlled by employing in the initial heating step up to 130° C. a much slower heating rate, for example, 0.5° C./ min. to obtain bulk densities in the higher portion of the range, and conversely, by using a higher heating rate, but not above about 5° C./min., for example 3° C./min. to obtain bulk densities in the lower portion of this range.

In carrying out the present process, the feed material employed is disodium orthophosphate dihydrate (DSP.Duo). This can be prepared in a number of ways but the simplest is the reaction of phosphoric acid with a sodium compound that yields either carbon dioxide or water on reaction with the phosphoric acid. Suitable sodium compounds include sodium carbonate and sodium hydroxide. The phosphoric acid and sodium compound are mixed in proportions to yield a molar ratio of sodium to phosphorus of about 2/1 and are reacted together in an aqueous solution or slurry. Upon reaction of the phosphoric acid and sodium compound, a disodium orthophosphate solution is formed and when this solution is evaporated to dryness, a dried crystalline product of DSP.Duo is formed. This is then cooled and screened to separate a $-20 +100$ mesh granular product which is used as the feed to the present process.

The DSP.Duo feed is then placed in a heating zone where it can be heated at carefully controlled rates. The most suitable equipment employed for this purpose is a rotary calciner. The calciner can be directly heated by means of a gas flame introduced into one end of the rotary calciner. However, it is difficult to accurately control the flame and gases from the flame to obtain the low heating rates employed in the present process. For this reason, it is preferred to employ an indirectly heated calciner, particularly one in which the calciner is heated by a plurality of burners on the outside of the calciner in order to obtain accurate and controlled, slow heating of the DSP.Duo inside the calciner. The calciner can be equipped with flights to enable the bed of DSP.Duo to be thoroughly mixed and uniformly heated so as to avoid any hot spots in the calciner which will lead to some of the DSP.Duo being heated at an undesirably higher heating rate than the remainder of the bed of DSP.Duo.

In practice, the DSP.Duo is added either in batch or continuously into the rotary calciner and is there subjected to a heating rate of not higher than about 5° C. per minute until it reaches a temperature of about 130° C. The DSP.Duo entering the rotary calciner can be at room temperature or somewhat higher then room temperature, but generally is not above about 60° C. During this slow heating stage of the DSP.Duo, water is slowly released so that agglomeration of the particles is minimized. I have found that heating rates as slow as 0.5° C. per minute up to 5° C. per minute have been found to yield a product having the desired medium density and fast dissolving rates.

After the DSP.Duo has been heated at the aforesaid slow heating rates, and the temperature of the resulting mass in the rotary calciner has reached 130° C., the rate of heating can then be increased until the temperature of the mass reaches from about 350° C. to about 550° C. It is then held at this temperature until the entire mass has been essentially converted to the TSPP product. In practice, temperatures higher then 550° C. can be employed but these higher temperatures are generally not required, are wasteful of heat, and further require special equipment for handling and cooling the resulting product. The resulting product is then preferably crushed so that 100% passes through a 20 mesh (U.S. Standard Sieve) while 80% is retained on the 100 mesh screen. When proceeding in this manner, the resulting TSPP product has been found to have a density of from about 0.73 to about 0.84 grams per liter and to dissolve in about three minutes or less.

The bulk density of the resulting product is measured by a standard Solvay test procedure well known in the art in which an excess of the product is allowed to flow from a funnel into a calibrated cup; the excess is then immediately removed with a spatula and the cup is weighed to yield the bulk density.

The dissolving time of the resulting TSPP is measured by a test procedure in which the time is measured for 15 grams of the granular product to dissolve in 300 milliliters of water at 25° C. agitated by 1"×1" wide by 3" long blade resting on the bottom of a 600 milliliter glass beaker, with the blade being turned at 200 rpm.

In the instant process, it is possible to control the bulk density of the resulting TSPP so that it can be either on the higher side of the medium density range or on the lower side of the medium density range by appropriately selecting the initial heating rate of the DSP.Duo in the rotary calciner. For example, if the DSP.Duo is heated at a rate of 0.5° C. per minute, the bulk density of the resulting granular TSPP product is about 0.81 grams per milliliter. On the other hand, if the heating rate employed is somewhat higher, for example, 3° C. per minute, the bulk density of the resulting TSPP granular product is about 0.74 grams per milliliter. In both cases, the product is considered to have a medium bulk density but in one case it is on the higher side of the medium bulk density range whereas in the other it is on the lower side of this range.

To illustrate, but not to limit the invention, the following examples are presented. All parts and percentages given are by weight unless otherwise indicated.

EXAMPLE I

Disodium orthophosphate dihydrate was prepared by a conventional rotary process. Phosphoric acid, sodium carbonate and water were reacted together to give a sodium orthophosphate solution having a molar ratio of sodium to phosphorus of 2/1 and a density of 50° C. baume at 100° C. The resulting solution was then evaporated to dryness in a rotary dryer and the dried product then cooled and screened to separate a −20 +100 mesh granular DSP.Duo product.

Thereafter, 200 grams of the DSP.Duo were charged into a laboratory calciner, three inches in diameter and six inches long with one end completely closed and the other closed except for a one inch hole in the center and with four equally spaced one-half inch flights. The tube was rotated at about 25 revolutions per minute which caused the solids inside to form a gently rolling bed. A thermocouple was mounted so that it rode on the outer surface of the tube that measured the outside tube temperature. Various heating rates were applied by means of multiple burners located directly under the rotating tube. Heat was applied to the tube as it rotated at 25 rpm such that the the tube's outer shell temperature increased approximately 0.5° C. per minute after it reached a 60° C. start temperature. This heating rate was maintained for about 140 minutes until the tube temperature reached about 130° C. At this point, most of the water had been released, as evidenced by the absence of vapor escaping from the tube hole, and the heating rate was then increased to about 10° C./min. This was maintained for another 30 minutes until the temperature reached 450° C. and then this temperature was maintained until calcination to the tetrasodium pyrophosphate was complete. No agglomeration problems arose. The bed remained free flowing and nonsticky. The process was repeated in three separate runs.

The TSPP product thus obtained was measured with respect to bulk density and screen size and then lightly crushed so that essentially all of it went through a 20 mesh standard sieve screen. The resulting bulk density and screen size of the original and lightly crushed products are set forth below in Table I. Dissolving time of the lightly crushed product is also included in Table I. As will be observed, the resulting products of these runs were all medium density TSPP having dissolving times of about three minutes or less. Note further that although the bulk density is within the medium density range, it is on the higher side of the medium density range because of the very slow heating rate employed in the first part of this process.

EXAMPLE II

The procedure set forth in Example I hereinabove was repeated with the exception that the heating rate was increased to 3° C. per minute for 35 minutes until the temperature of 130° C. had been reached. Thereafter, the heating rate was increased to 10° C. per minute until the final temperature reached 450° C. The heat was maintained at 450° C. until all of the orthophosphate was converted to tetrasodium pyrophosphate. No agglomeration problems arose. This was repeated in five different runs and the results of these runs are set forth in Table II. The increased heating rate employed in the first part of the process vis-a-vis Example I resulted in a product on the lower side of the medium density range.

EXAMPLE III

Heating Rates Outside the Scope of the Present Invention

The procedure described in Example I hereinabove was repeated with the exception that the heating rate was increased to 22° C. per minute during the initial 20 minutes until the tube temperature reached 450° C. The heating was continued until all of the DSP.Duo was converted to pyrophosphate. This procedure was repeated in three separate runs and the results are set forth in Table III.

At such fast heating rates, water was released at a more rapid rate over the time required to convert the DSP.Duo to TSPP. Agglomeration was prevalent, requiring continuous rapping on the tube wall to prevent the wet solids from becoming a massive glob. When rapping was effectively done, the finished STPP sizing was very coarse as evidenced by the fact that only 70% passed through a 20 U.S. standard mesh. This was lightly crushed in the same manner as set forth in Example I so that virtually 100% passed through a 20 mesh.

As will be observed in the results of Table III, when the DSP.Duo is heated at faster heating rates then as set forth in the present process, the dissolving time materially increases and is far above that obtained in Examples I and II which illustrate the present invention.

I claim:
1. A process for producing a granular tetrasodium pyrophosphate having a bulk density of from about 0.73 to about 0.84 g/ml and a dissolving time of about three minutes or less comprising heating crystalline disodium orthophosphate dihydrate at a slow heating rate, but not above about 5° C. per minute, until its temperature reaches about 130° C. and then calcining this intermediate product at a temperature of from about 350° C. to about 550° C. until it has been converted to tetrasodium pyrophosphate.
2. Process of claim 1 wherein said slow heating rate is about 0.5° to 5° C./minute.
3. Process of claim 1 wherein said slow heating rate is about 0.5° C./minute and the bulk density is at the higher end of the medium bulk density range of about 0.73 to about 0.84 g/ml, commencing at about 0.80 g/ml.
4. Process of claim 1 wherein said slow heating rate is about 3° C./minute and the bulk density is at the lower end of the medium bulk density range of about 0.73 to about 0.84 g/ml, up to about 0.759 g/ml.
5. Process of claim 1 wherein said heating of the granular tetrasodium pyrophosphate at said slow heating rate is carried out in a rotary calcining zone indirectly heated by a plurality of external heating zones.
6. Process of claim 5 wherein the interior of the rotary calcining zone contains flights.

* * * * *

TABLE I

| Runs | Bulk Density g/ml | "As is" Screens | | | | Bulk Density After Crushing g/ml | "Crushed" Screens | | | Disslv. Time, Minutes |
|---|---|---|---|---|---|---|---|---|---|---|
| | | % +16 | % +20 | % +60 | % −100 | | % +20 | % +60 | % −100 | |
| 1 | 0.825 | 0.18 | 0.32 | 32.4 | 16.2 | 0.822 | 0.01 | 31.5 | 16.8 | 3.2 |
| 2 | 0.821 | 0.04 | 0.21 | 32.0 | 20.8 | 0.804 | 0.01 | 29.9 | 20.8 | 3.2 |
| 3 | 0.815 | 0.06 | 0.16 | 27.9 | 22.6 | 0.808 | 0.01 | 28.1 | 23.6 | 3.0 |

TABLE II

| Runs | Bulk Density g/ml | "As is" Screens | | | | Bulk Density After Crushing g/ml | "Crushed" Screens | | | Disslv. Time, Minutes |
|---|---|---|---|---|---|---|---|---|---|---|
| | | % +16 | % +20 | % +60 | % −100 | | % +20 | % +60 | % −100 | |
| 1 | 0.736 | 0.18 | 0.58 | 54.9 | 4.3 | 0.736 | 0.01 | 56.9 | 5.21 | 2.6 |
| 2 | 0.760 | 1.22 | 2.35 | 50.1 | 11.3 | 0.758 | 0.10 | 49.2 | 12.00 | 3.7 |
| 3 | 0.737 | 0.40 | 0.93 | 44.4 | 11.7 | 0.725 | 0.00 | 44.1 | 10.50 | 3.5 |
| 4 | 0.745 | 1.40 | 2.18 | 60.8 | 5.6 | 0.724 | 0.10 | 60.1 | 6.10 | 3.3 |
| 5 | 0.763 | 0.26 | 0.92 | 59.9 | 7.8 | 0.759 | 0.04 | 60.5 | 7.50 | 3.2 |

TABLE III

| Runs | Bulk Density g/ml | "As is" Screens | | | | Bulk Density After Crushing g/ml | "Crushed" Screens | | | Disslv. Time, Minutes |
|---|---|---|---|---|---|---|---|---|---|---|
| | | % +16 | % +20 | % +60 | % −100 | | % +20 | % +60 | % −100 | |
| 1 | 0.890 | 35.8 | 40.0 | 83.2 | 3.7 | 0.869 | 0.01 | 28.1 | 23.6 | 5.7 |
| 2 | 0.852 | 33.0 | 37.9 | 85.0 | 0.8 | 0.832 | 0.80 | 66.3 | 17.2 | 5.9 |
| 3 | 0.744 | 10.6 | 23.3 | 91.2 | 1.4 | 0.764 | 0.21 | 73.1 | 11.3 | 4.7 |